US005605321A

United States Patent [19]

Jarvis

[11] Patent Number: 5,605,321

[45] Date of Patent: Feb. 25, 1997

[54] APPARATUS FOR HOLDING SNOWBOARDS, SKIS, KNEEBOARDS, SURFBOARDS AND BICYCLES

[76] Inventor: Paul Jarvis, 51 Mt. Kemble Ave. - #308, Morristown, N.J. 07960

[21] Appl. No.: 284,257

[22] Filed: Aug. 2, 1994

[51] Int. Cl.[6] .......... B23Q 3/02

[52] U.S. Cl. .......... 269/100; 269/130; 269/268; 269/296; 269/900; 211/17

[58] Field of Search .......... 269/296, 900, 269/45, 100, 101, 130, 131, 268, 269; 211/17, 18

[56] References Cited

U.S. PATENT DOCUMENTS

| | | | |
|---|---|---|---|
| 640,736 | 1/1900 | Biester . | |
| 2,583,877 | 1/1952 | Peyron | 269/101 |
| 2,742,635 | 4/1956 | Capps | 269/131 |
| 3,877,622 | 4/1975 | McLain . | |
| 3,883,128 | 5/1975 | Breese | 269/45 |
| 3,947,010 | 3/1976 | Zeller | 211/17 |
| 4,007,862 | 2/1977 | Heftmann . | |
| 4,050,616 | 9/1977 | Mosow . | |
| 4,057,182 | 11/1977 | Kolkhorst et al. | 211/18 |
| 4,061,326 | 12/1977 | Proudman . | |
| 4,291,869 | 9/1981 | Hickman . | |
| 4,513,897 | 4/1985 | Graber . | |
| 4,575,061 | 3/1986 | Dille | 269/45 |
| 4,700,845 | 10/1987 | Fretter . | |
| 4,793,535 | 12/1988 | Johnson . | |
| 4,911,419 | 3/1990 | Deakin et al. . | |
| 5,078,276 | 1/1992 | Rogge et al. . | |
| 5,107,599 | 4/1992 | Marincic et al. | 269/45 |
| 5,211,323 | 5/1993 | Chimenti et al. . | |

FOREIGN PATENT DOCUMENTS

| | | | |
|---|---|---|---|
| 1127765 | 12/1956 | France | 211/17 |

*Primary Examiner*—Robert C. Watson
*Attorney, Agent, or Firm*—Mathews, Woodbridge & Collins

[57] ABSTRACT

The invention relates to a support apparatus for holding an object such as a ski, snowboard, bicycle surfboard or the like. A support base is attached to a work surface. The support base supports the object. In one embodiment, a base supports a ski or snowboard such that the user has access to the bottom and the side surface of the ski.

1 Claim, 14 Drawing Sheets

12
24
30
32
34
35
36
37
40
41
42
16,18
D3
D4
A1

APPARATUS FOR HOLDING SNOWBOARDS, SKIS, KNEEBOARDS, SURFBOARDS AND BICYCLES

BACKGROUND OF THE INVENTION

1. Field of the Invention

This invention relates to an apparatus for holding an object such as a snowboard, ski, kneeboard, surfboard or bicycle in order to mount the object on a work surface.

2. Description of the Related Art

Racks have been used for securing objects to a roof or rear of a car. U.S. Pat. No. 4,007,862 describes a detachable car rack for a surfboard. An elongated support pad made of neoprene is disposed between the surfboard and the roof. A frame member is attached with a pair of straps to the support member. The strap members cooperate with the support pad to form a loop that is adjustable to tightly fasten the surfboard to the roof. Each strap also includes a hook member at one end thereof. The strap member folds back from the frame to attach the hook member to the roof of the car.

U.S. Pat. No. 4,513,897 describes a carrier for mounting a bicycle on the rear body portion of a vehicle. A front and rear pair of elongated legs are connected at their upper ends and engage the vehicle at their lower ends. Bicycle support arms attach to the carrier. A lever pivotally mounted on the outer end of the arms can be arranged to be locked by a padlock. The above-described patents have the drawback of being attached to a motor vehicle and can not be supported on a work surface.

U.S. Pat. No. 4,700,845 describes a bicycle storage system for storing bicycles and accessories and supporting bicycles for maintenance. A pair of J shaped hooks are mounted to a shelf. A pair of brackets mount the shelf to a wall. A clamp assembly is used with the J shaped hooks to form three suspension points for the bicycle. However, this patent has the limitations of being immovably attached to the wall and not allowing sufficient clearance between the suspension points and the wall to allow the bicycle to be pedaled during maintenance.

U.S. Pat. No. 4,291,869 describes a workbench including a work top and a movable jaw attached thereto. The movable jaw can be used for holding a workpiece there between. A swiveling stop apparatus can also be used with the workbench for holding regular and irregular shaped workpieces. This patent has the shortcoming of not providing sufficient clearance from the work bench to hold a snowboard, ski or the like and does not provide access to the edges of the gripped item for maintenance thereof.

SUMMARY OF THE INVENTION

Briefly described, the present invention comprises an apparatus for supporting an object on a work surface. In one embodiment, a plurality of base members support an elongated object, such as a ski or a snowboard. The base members include an indentation on the top surface thereof for receiving the object. Preferably, the indention of the indentation is smaller than the height of the side surface of the object, thereby allowing a user to have access to the edge of the object for performing maintenance thereon. The base members are preferably attached to a hole in the work surface with a threaded portion and nut portion.

In an alternative embodiment, a plurality of base members include a padded inner surface. The padded inner surface of a first one of the base members contacts the top surface of the object and the padded inner surface of a second one of the base members contacts the bottom surface of the object. This embodiment provides additional stability for holding the object along the width thereof.

Alternatively, the apparatus supports a surfboard, kneeboard or the like on a work surface. A strap wraps around the board. Each end of the strap is connected to a support base. A rod of the support base is received in a hole of the work surface. Preferably, a spring rod biases the rod in the opening. After coupling the pair of support bases to the work surface, the length of the strap can be adjusted in order to tightly secure the surfboard to the work surface.

In an alternate embodiment, the apparatus can be used to support a bicycle on a work surface. A base having a depression at one end thereof supporting the bicycle. An adjusting means secures the bicycle in the depression. A rod extends perpendicularly from the base at the other end thereof. The rod is received in an hole in the work surface. A nut is used to couple the rod to the work surface.

The invention will be more fully described by reference to the following drawings.

DETAILED DESCRIPTION OF THE PRESENT INVENTION

During the course of this description, like numbers will be used to identify like elements according to the different views that illustrate the invention.

Figure 1A:
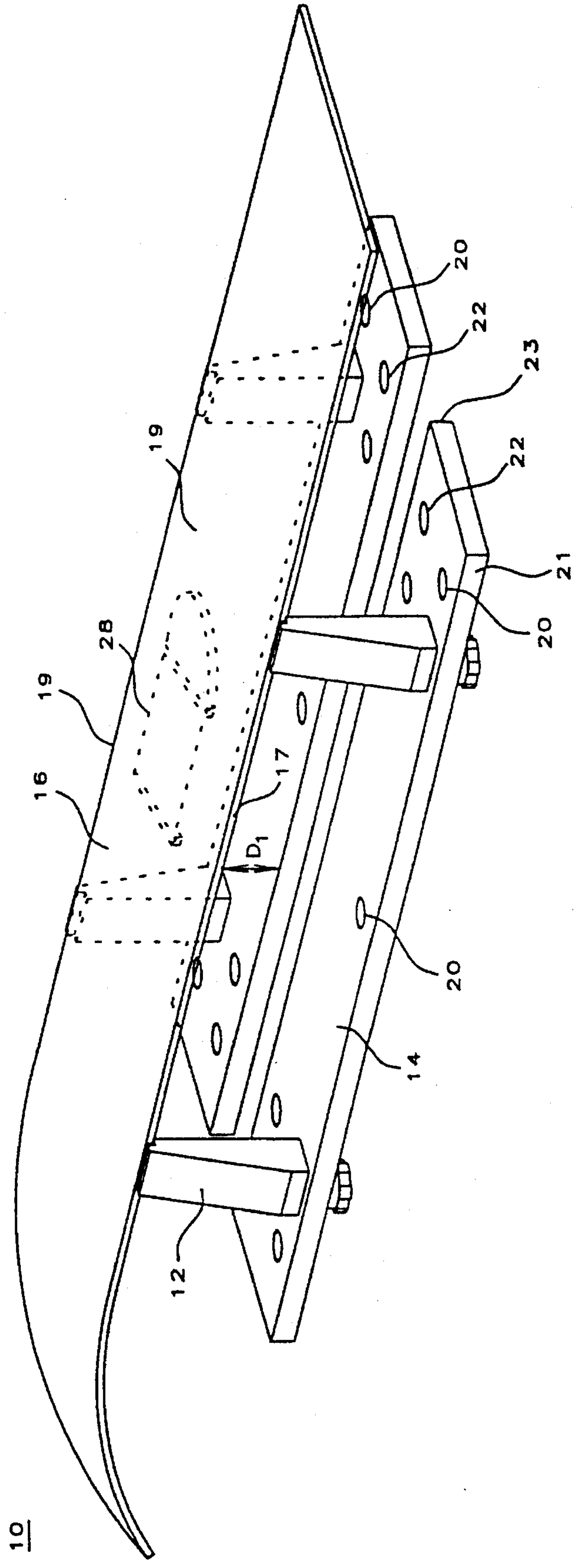
FIG. 1A is a perspective view of an apparatus for supporting an object on a work surface in accordance with the teachings of the present invention in which the object is a snowboard.
Figure 1B:
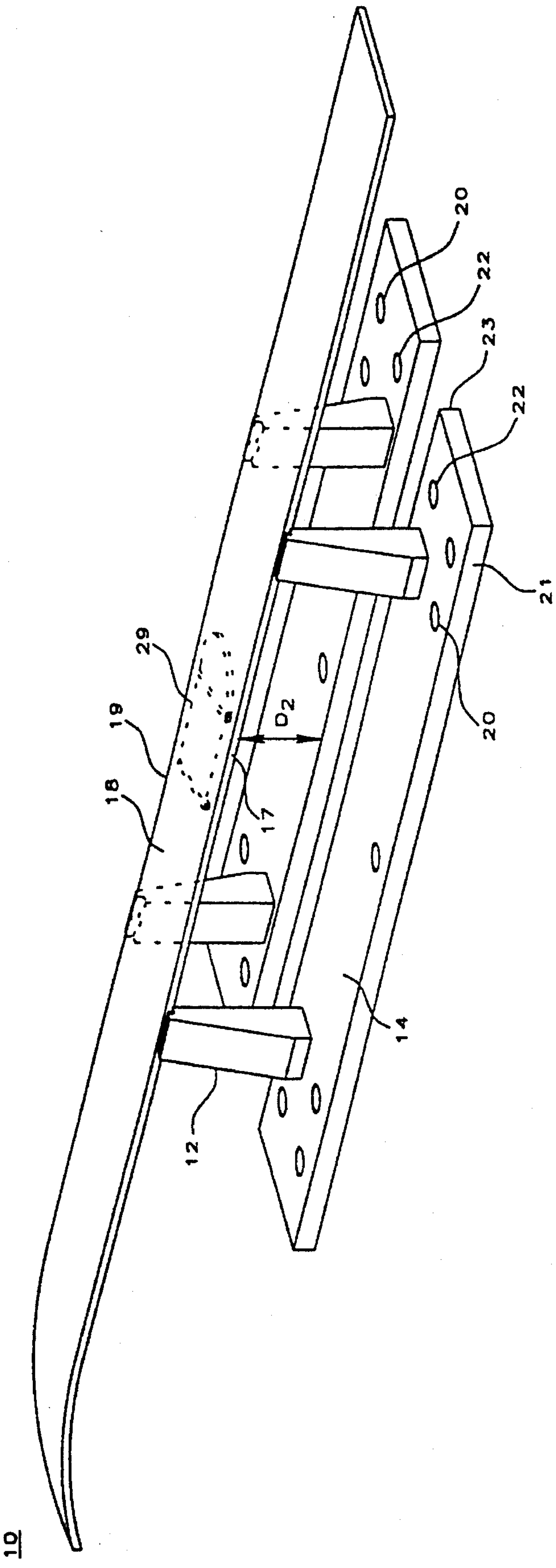
FIG. 1B is a perspective view of the apparatus in which the object is a ski.

FIGS. 1A and 1B illustrate a perspective view of an apparatus for holding an object 10 in accordance with the principals of the present invention. Support base 12 is removably attached to work support surface 14. In a first embodiment snowboard 16 is supported by support base 12, as shown in FIG. 1A. In a second embodiment, ski 18 is supported by support base 12, as shown in FIG. 1B.

Preferably, work support surface 14 has a first row of holes 20 and a second row of holes 22. The first row of holes 20 is positioned adjacent outer side surface 21 and the second row of holes 22 is positioned adjacent inner side surface 23 of work support surface 14. Support base 12 is positioned in one of holes 20 for supporting snowboard 16 and support base 12 is positioned in one of holes 22 for supporting ski 18. A pair of support bases 12 are preferably used for supporting snowboard 16 and ski 18 adjacent each side surface 17, 19.

Preferably, in the first embodiment base 12 has a predetermined height $D_1$ for providing sufficient clearance between bindings 28 attached to snowboard 16 and upper surface 23 of work support surface 14. In the second embodiment, base 12 has a predetermined height $D_2$ for providing sufficient clearance between bindings 29 attached to ski 18 and upper surface 23 of work support surface 14.

Figure 2:
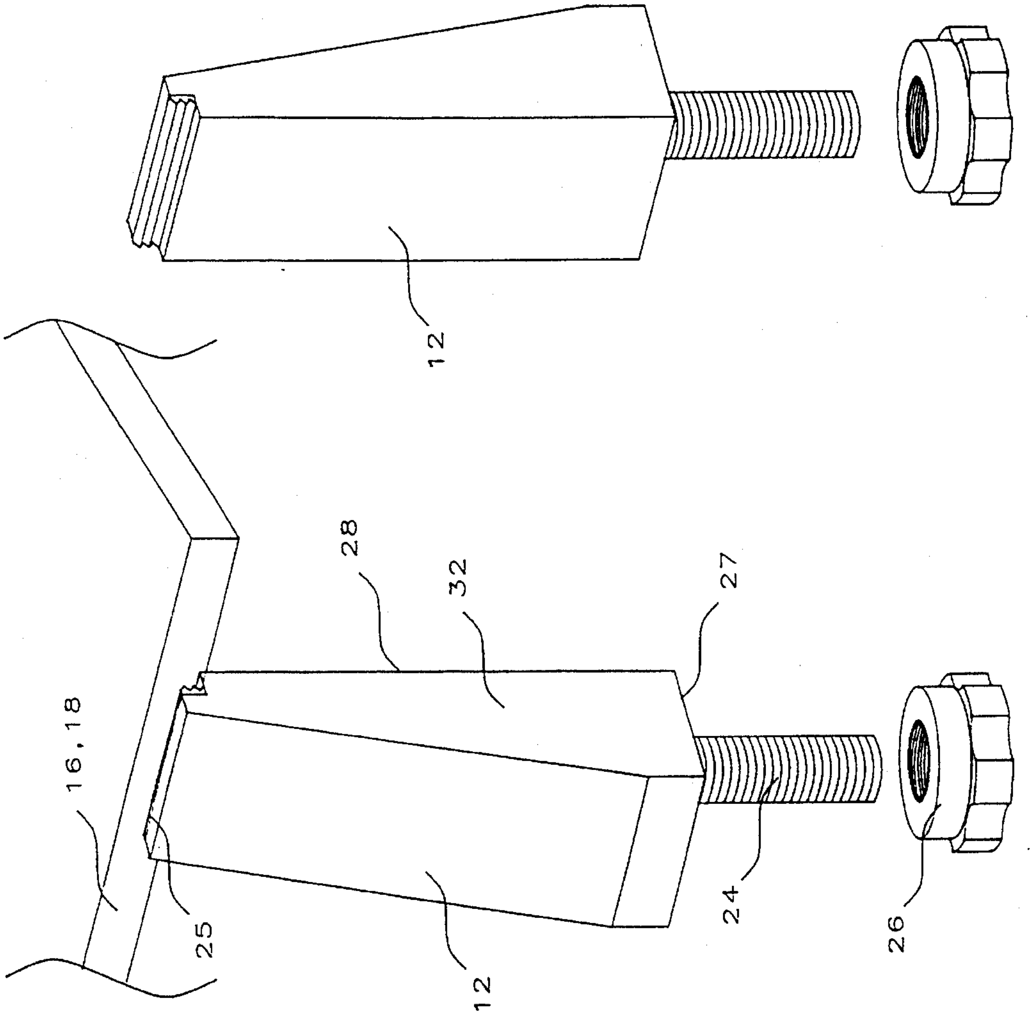
FIG. 2 is a front elevational view of a pair of support bases used on either side of the object.
Figures 3A, 3B, 3C, 3D, 3E:
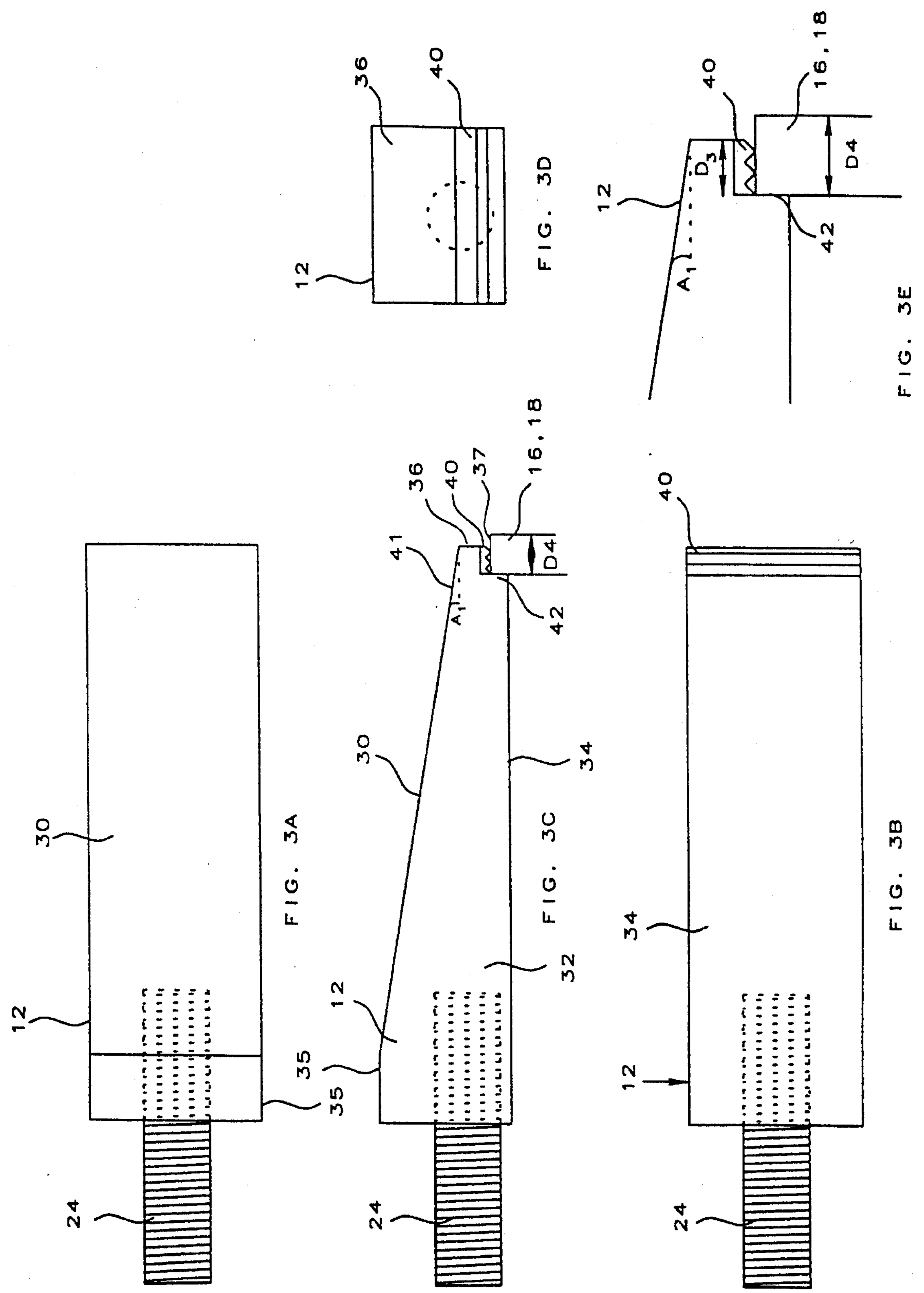
FIG. 3A is a rear view of the support base.
FIG. 3B is a front view of the support base.
FIG. 3C is a side view of the support base.
FIG. 3D is a top view of the support base.
FIG. 3E is an enlarged view of the top portion of the support base.

FIG. 2 illustrates a front elevational view of support base 12. Support base 12 includes a top surface 25 and a bottom surface 27. Threaded attachment portion 24 protrudes from bottom surface 27. Threaded attachment portion 24 extends through one of holes 20 or 22 and is received in nut 26. Nut 26 is tightened against bottom surface 15 of work support surface 14.

FIGS. 3A–3E illustrate more detailed views of support base 12 including rear surface 30, side surface 32, front surface 34 and top surface 36. Preferably, front surface 34 is perpendicular to side surface 32. Rear surface 30 is angled outwardly at an angle of $A_1$ from top surface 36 to lower section 35 of support base 12. Lower section 35 of base 12 is parallel to front surface 34.

Indentation 42 is formed in top surface 36. Preferably, the height $D_3$ of indentation 42 is smaller than the height $D_4$ of the side surface 17, 19 of respective snowboard 16 and ski 18 for providing access to edge 17, 19 of snowboard 16 and ski 18. Maintenance can be performed on edge 17, 19 after snowboard 16 or ski 18 is supported on support base 12. Padded member 40 can be coupled to inner surface 41 of indentation 42 for preventing damage to edge 17, 19. Preferably, padded member 40 is formed of soft rubber or foam rubber.

Figure 4A:
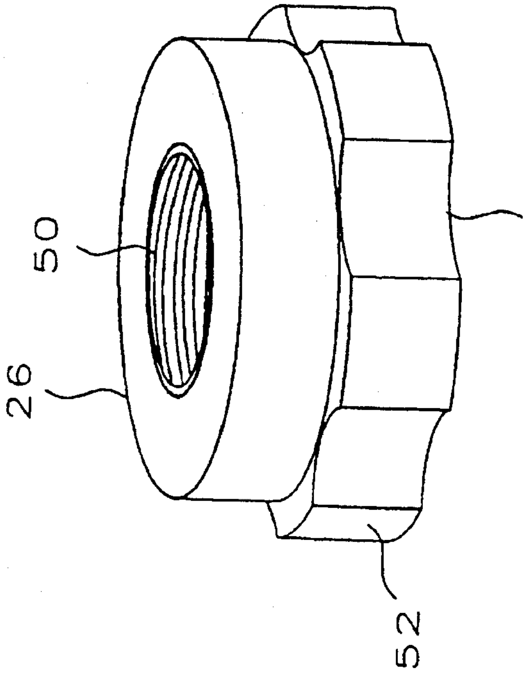
FIG. 4A is a front elevational view of a nut used with the support base.
Figure 4B:
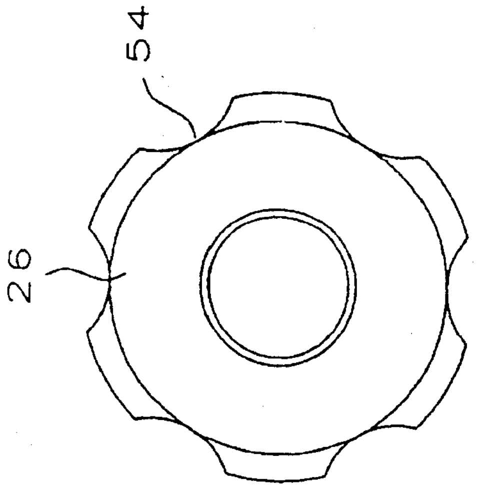
FIG. 4B is a bottom view of the nut.
Figure 4C:
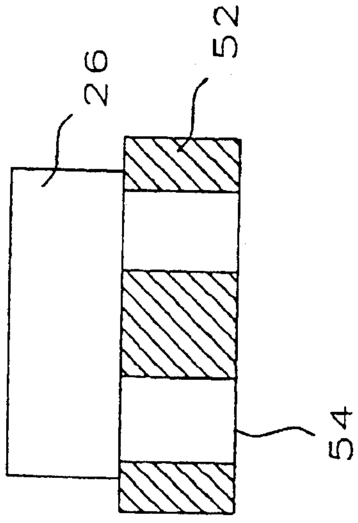
FIG. 4C is a cross-sectional view of the nut.

FIGS. 4A–4C illustrate detailed views of nut 26 which can be used with support base 12. Nut 26 includes threaded portion 50 for mating with threaded attachment portion 24.

Lower portion 52 of nut 26 can include u-shaped indentions 54 for aiding in engaging and disengaging nut 26 from threaded attachment portion 24.

Figure 5A:
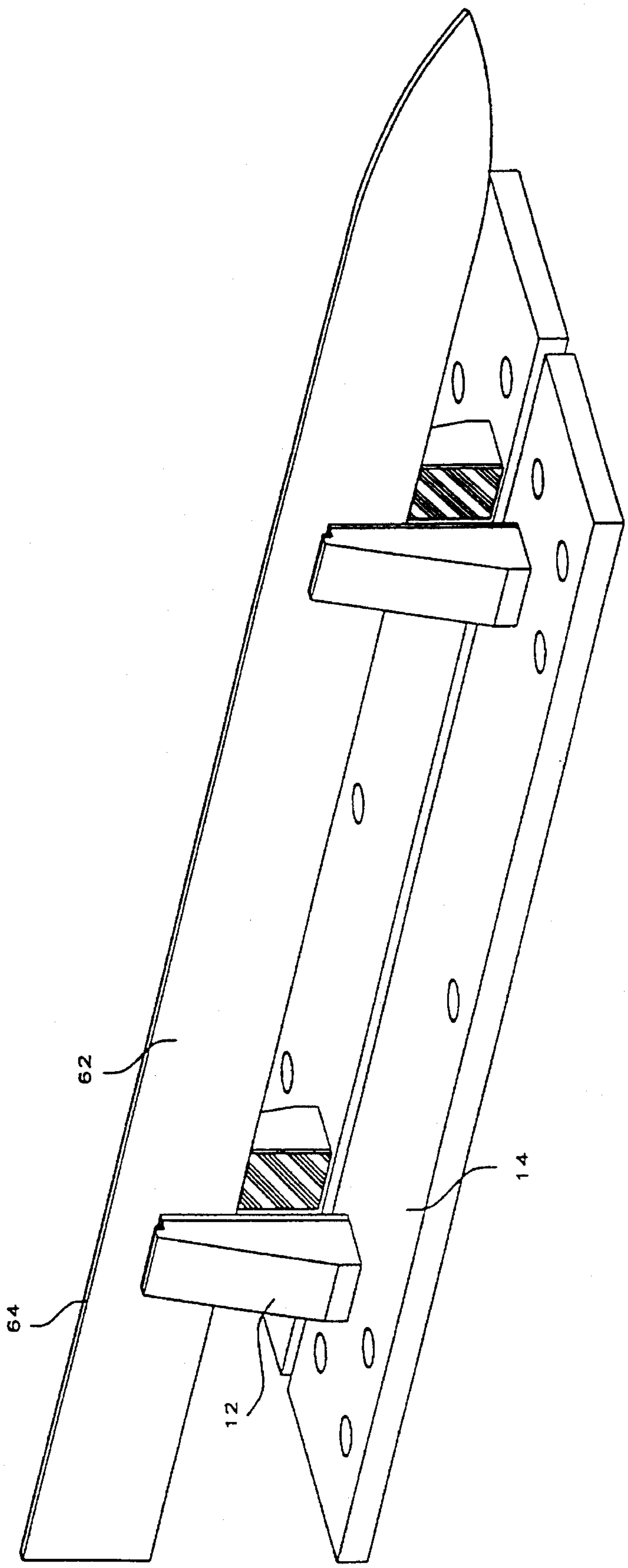
FIG. 5A is a perspective view of an alternative embodiment for the support base.
Figure 5B:
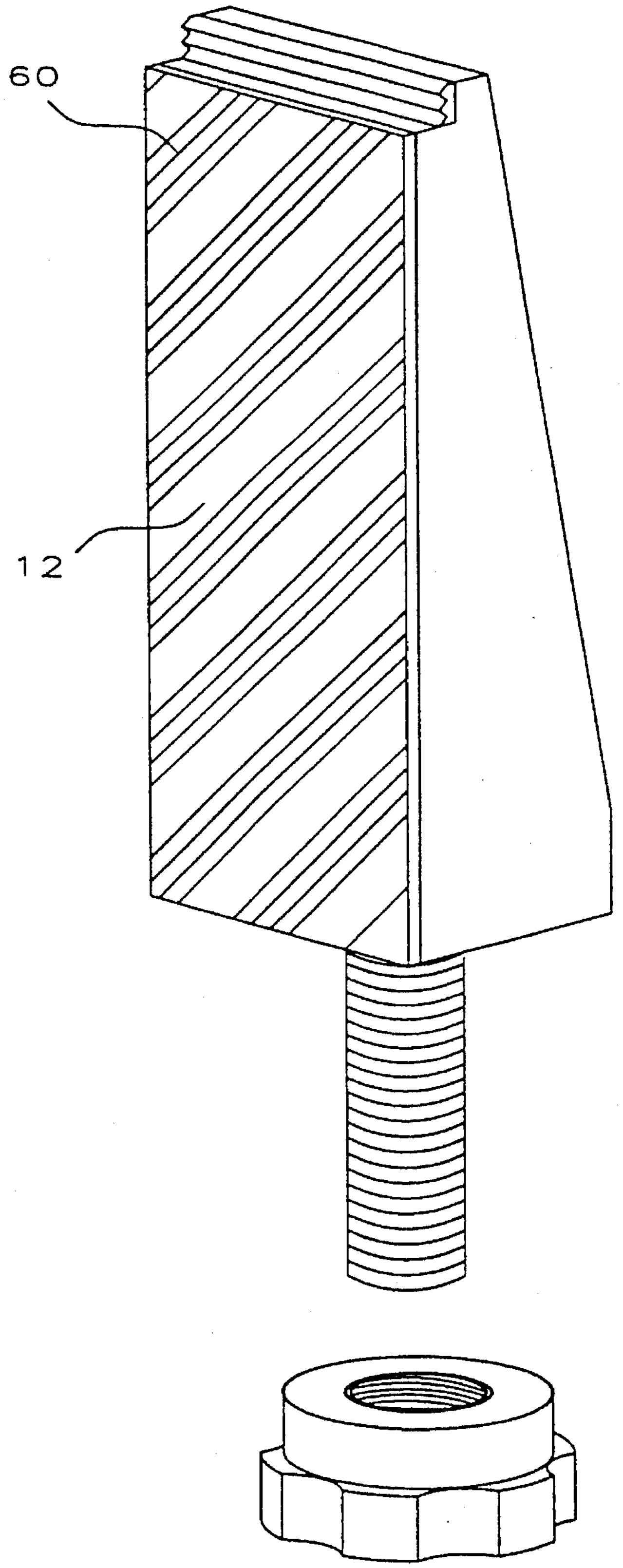
FIG. 5B is a side elevational view of the support member shown in FIG. 5A.

FIGS. 5A and 5B illustrate an alternate embodiment for support base 12 used for holding snowboard 16 or ski 18. Padded side portion 60 is coupled to side surface 32 of support base 12. Preferably, padded side portion 60 is formed of soft rubber or foam rubber. Padded side portion 60 contacts either bottom surface 62, or top surface 64 of snowboard 16 or ski 18. This embodiment provides additional support against bottom surface 62 and top surface 64 during maintenance thereof.

Figure 6A:
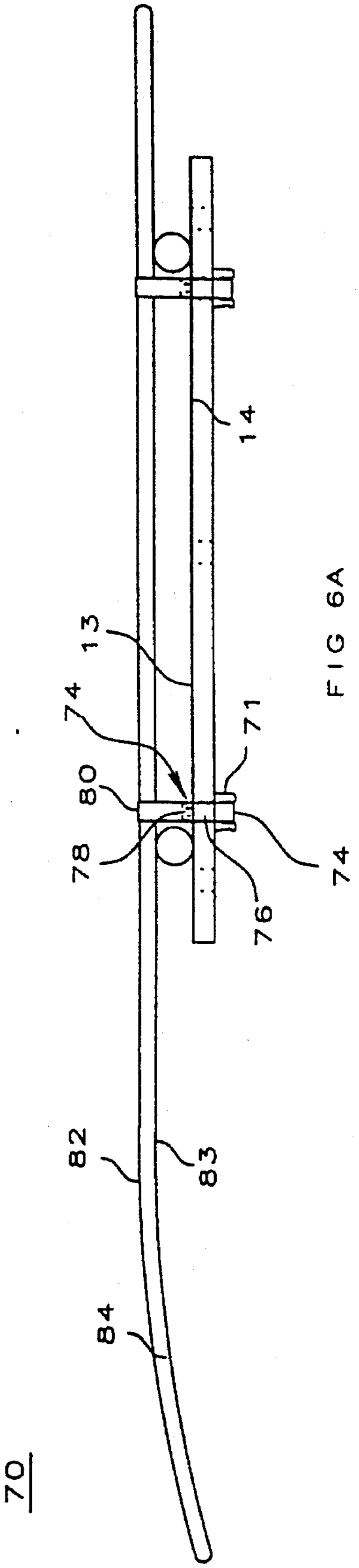
FIG. 6A is a side elevational view of an alternative embodiment of an apparatus for supporting board on a work surface.
Figure 6B:
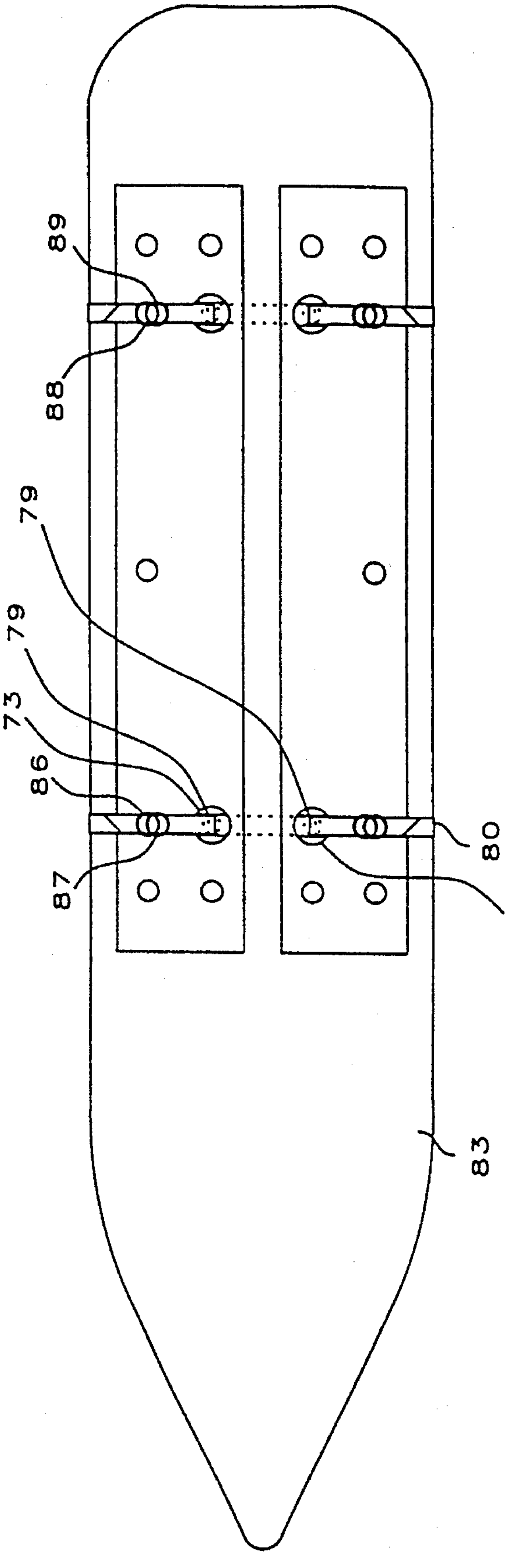
FIG. 6B is a bottom view of the apparatus shown in FIG. 6A.

FIGS. 6A and 6B illustrate an alternative embodiment of an apparatus for holding an object 70 in accordance with the principals of the present invention. As shown in FIG. 6A, support base 72 is inserted in hole 71 from below work support surface 14. Support base 72 includes base 74, rod 76 and bias member 78. Base 74 is connected to rod 76. Rod 76 is inserted into hole 71. Base 74 has a larger diameter than hole 71 for preventing base 74 from sliding through hole 71. After rod 76 is inserted in hole 71, spring rod 79 of biasing member 78 extends for biasing bias member 78 against upper surface 13 of work support surface 14.

Each end of strap 80 is coupled to a base 74. After one of the support bases 72 is inserted in hole 71, strap 80 wraps around surface 82 of surfboard 84. Preferably, the strap 80 comprises a continuous fabric strap made from polypropylene and is about one inch wide. The other one of the support bases 74 is inserted into hole 73 of work support surface 14.

Figure 6C:
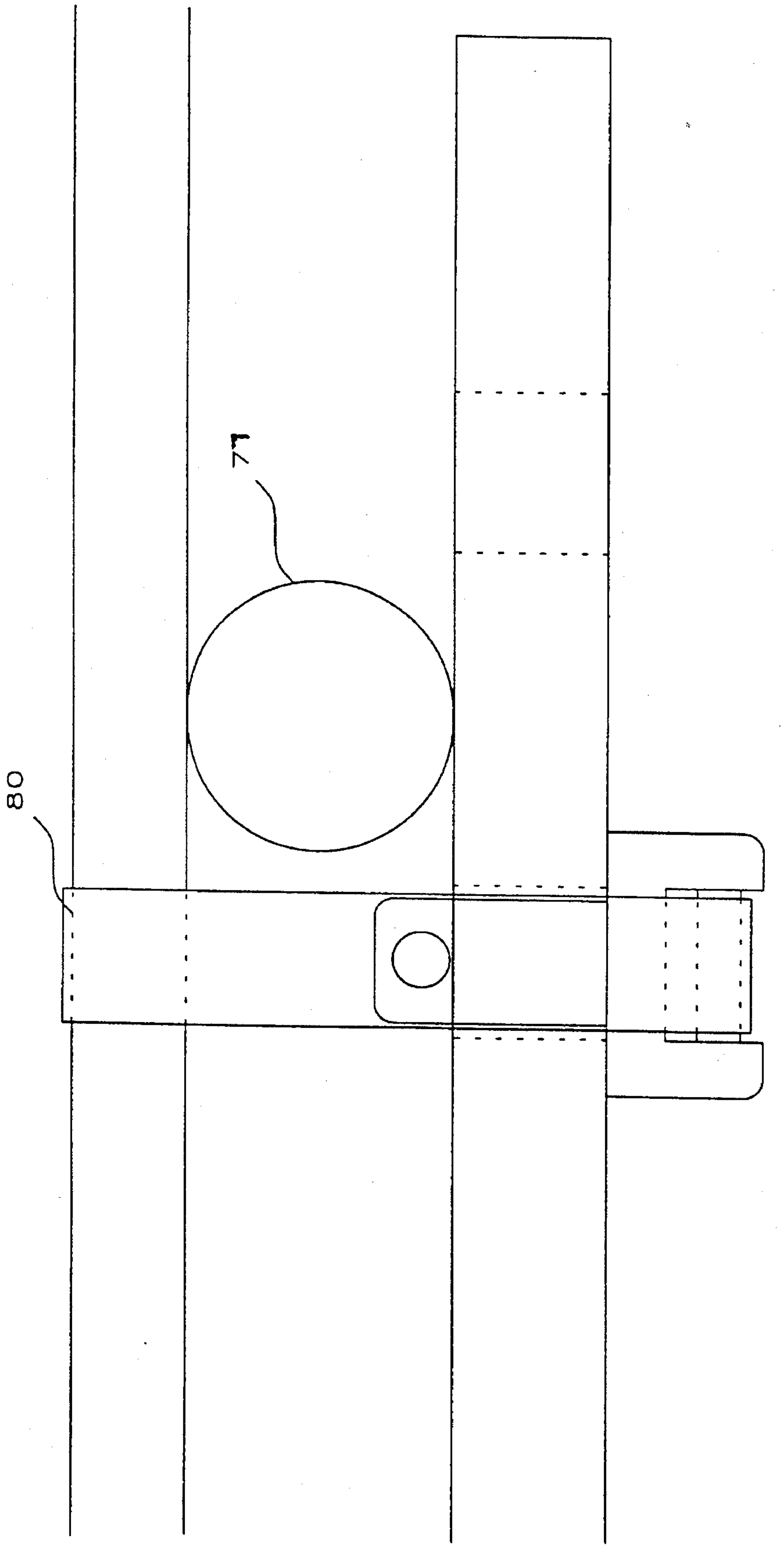
FIG. 6C is a side view of a strap and coupling means used in FIG. 6A.

Preferably, support pad 77 is placed between upper surface 13 of work support surface 14 and surface 83 of board 84, as shown in FIG. 6C. Support pad 77 can have a rounded oblong shape and have a predetermined length corresponding to the width of board 84. Strap 80 is threaded through an adjusting member 86 to draw and hold the strap tightly against board 84. Preferably, board 84 is a surfboard, kneeboard and the like.

Figure 6D:
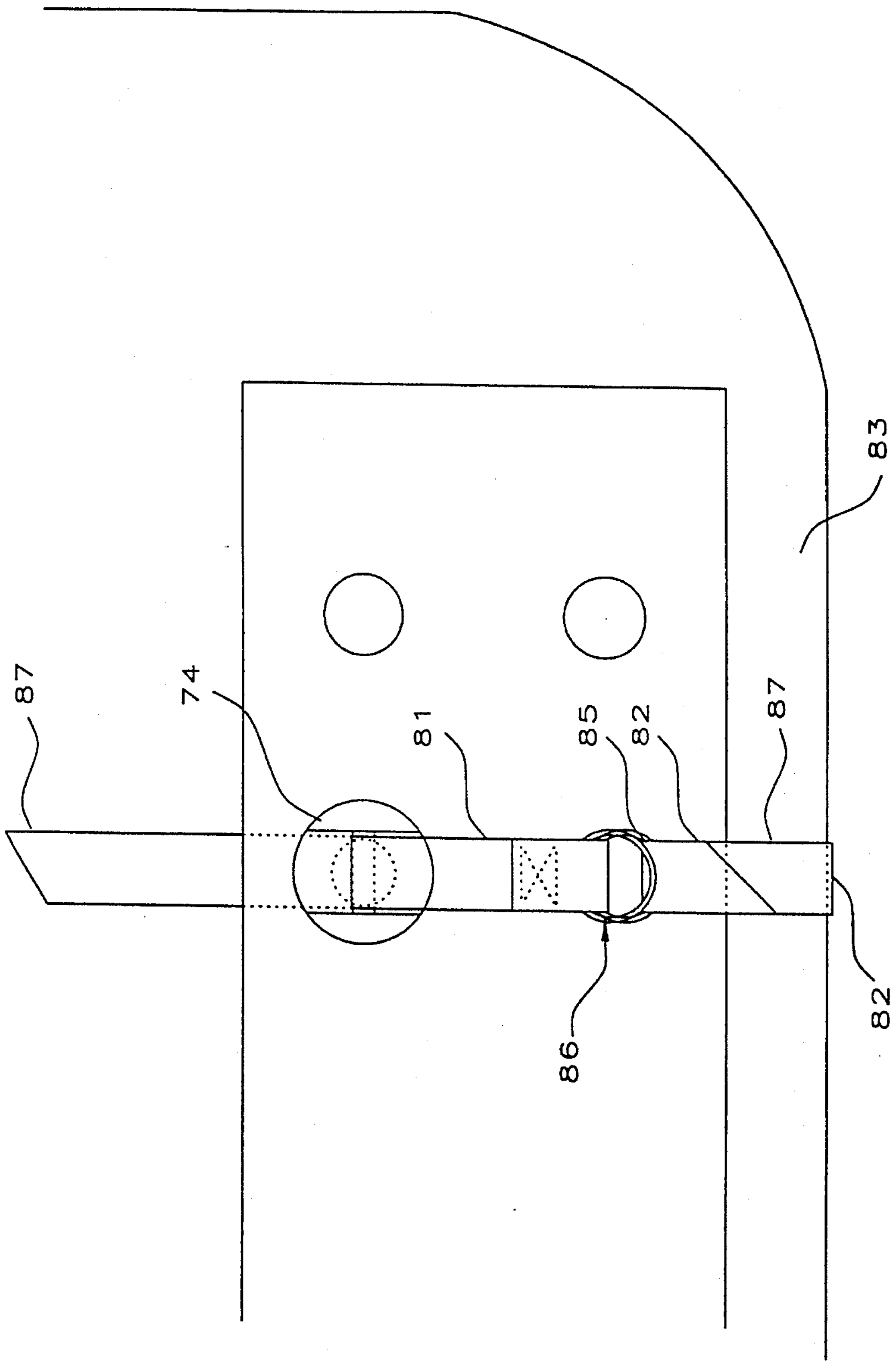
FIG. 6D is a detailed view of an adjustment means used with the apparatus shown in FIG. 6*a*.
Figure 6G:
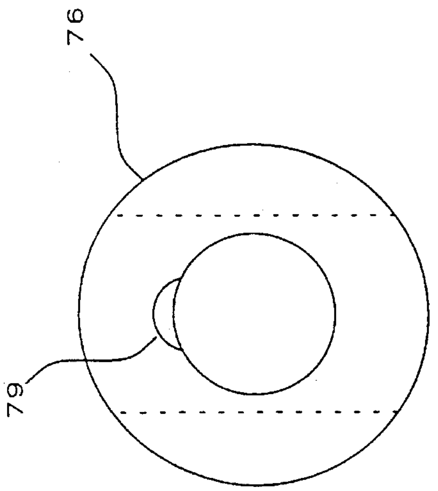
FIG. 6G is a top view of the support base.
Figure 6F:
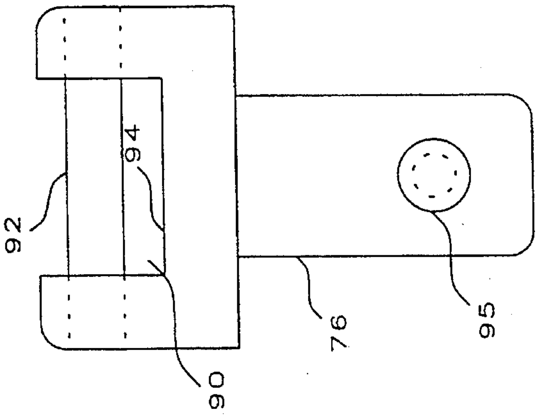
FIG. 6F is a front view of the support base.
Figure 6H:
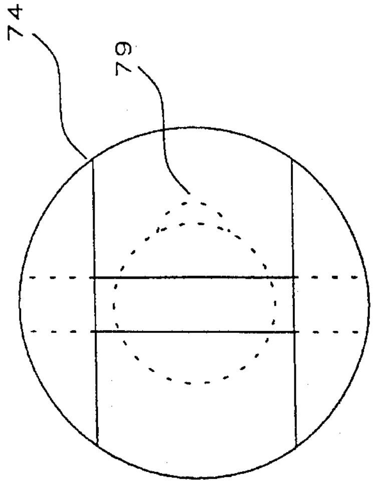
FIG. 6H is a top view of the support base.
Figure 6E:
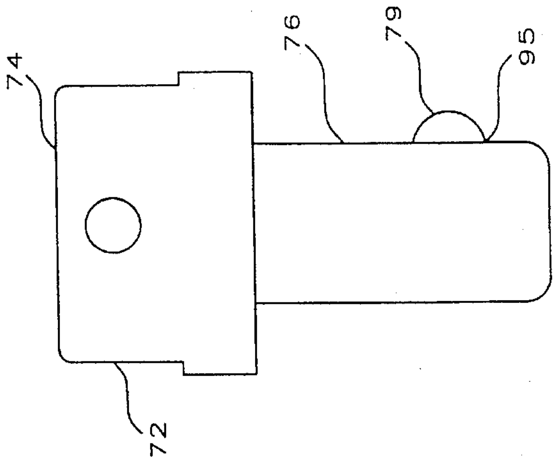
FIG. 6E is a side view of a support base used in the apparatus of FIG. 6A.

Preferably, adjusting means 86 is formed of a pair of rings 88, 89. Strap 80 includes a loop portion 81 and a strap body portion 82. Loop portion 81 is doubled back on itself around ring 88. Strap body portion 82 has a first end 85 and a second end 87. First end 85 wraps around ring 88 and is threaded through ring 89, as shown in FIG. 6D. Second end 87 is received in a second pair of rings 88, 89 cooperating with support base 74 inserted in hole 73. Second end 87 wraps around ring 88 and is threaded through ring 89. First end 85 and second end 87 can be adjusted to tightly hold board 84.

FIGS. 6E through 6H illustrate additional views of support base 72. Strap 80 is threaded through opening 90 between bar 92 and inner surface 94. Spring rod 79 extends through aperture 95 in support base 72. When rod 76 is inserted in holes 71, 73 spring rod 79 is retracted in aperture 95. After rod 76 is inserted in holes 71, 73, spring rod 79 extends to bias support base 72 against work support surface 14.

Figure 7A:
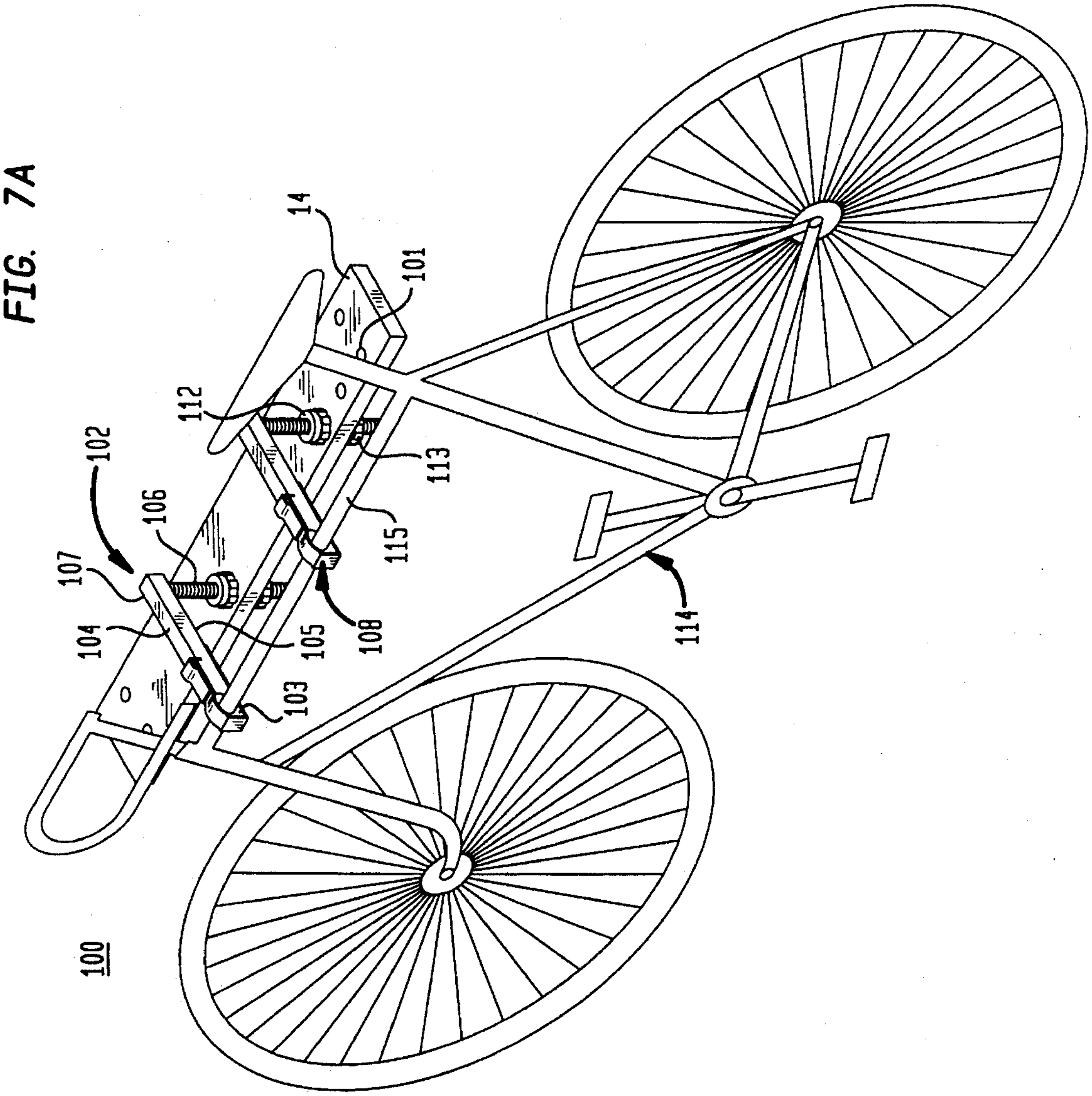
FIG. 7A is a perspective view of an alternate embodiment for supporting a bicycle.
Figure 7B:
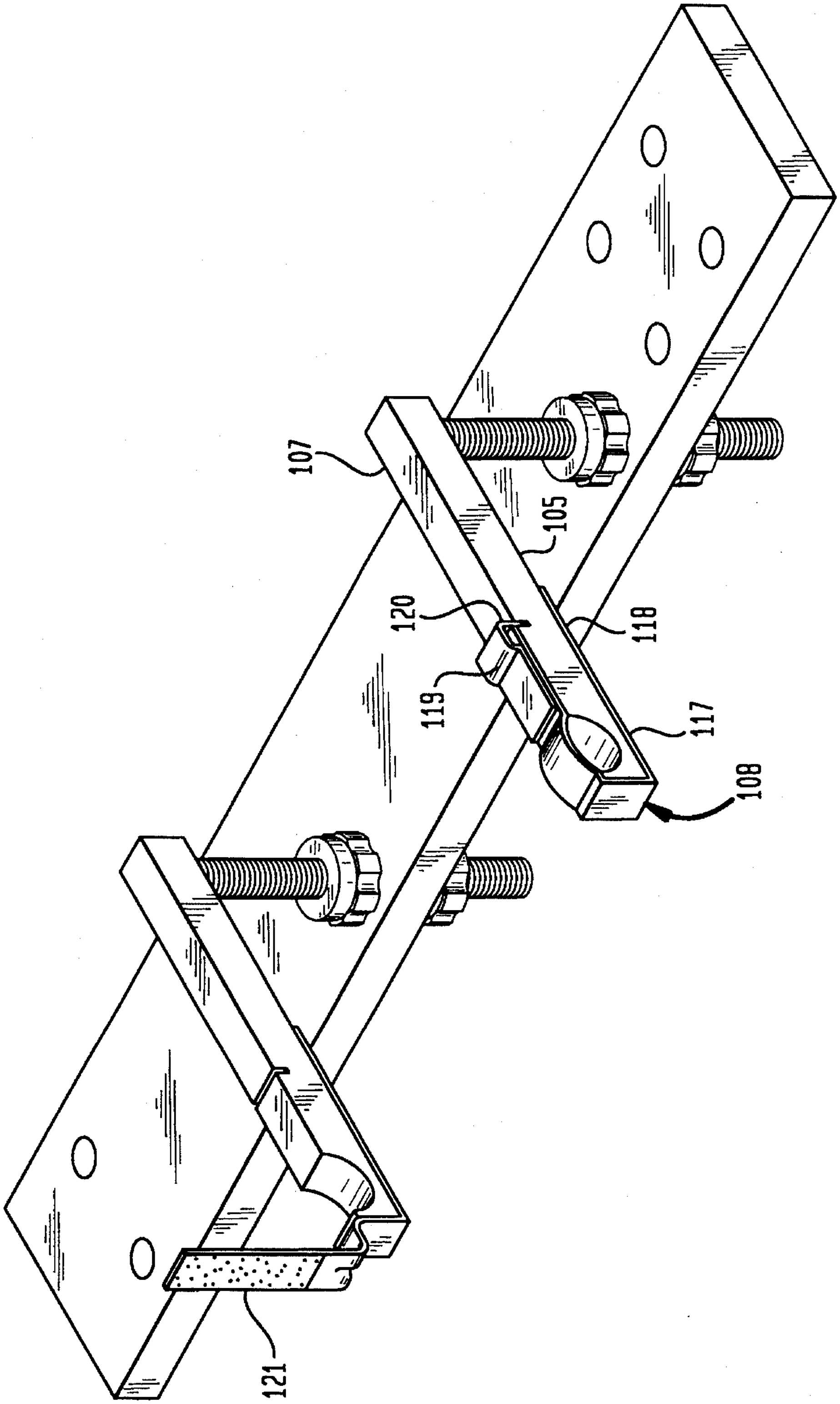
FIG. 7B is a detailed side view of a support base used in FIG. 7A.
Figure 7C:
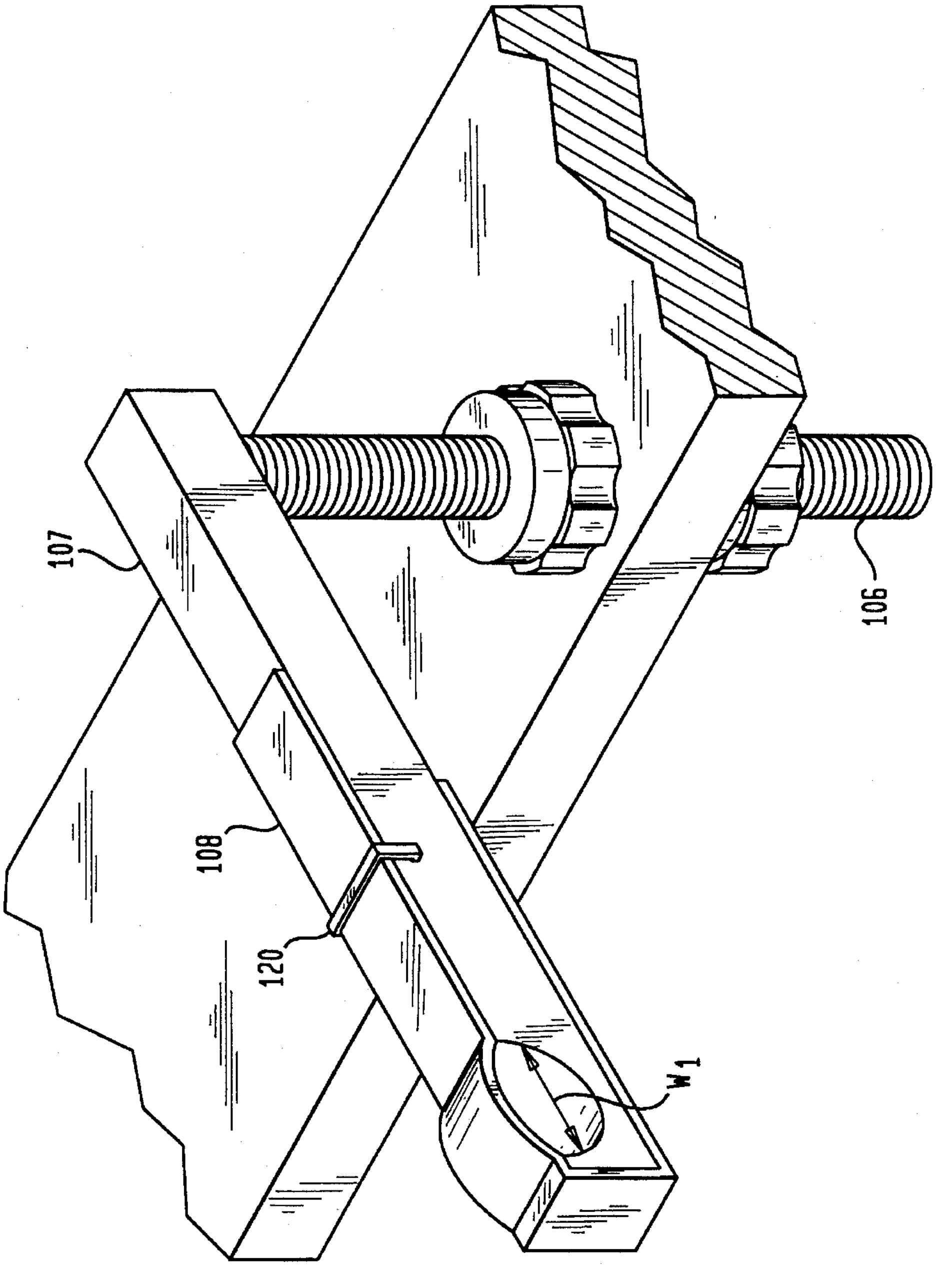
FIG. 7C is a detailed side view of adjustment means used in FIG. 7A.

FIGS. 7A–7C illustrate an alternative embodiment of an apparatus for holding an object 100, in accordance with the present invention. Support base 102 includes base 104, rod 106 and adjusting means 108. Rod 106 is inserted into hole 101 of work support surface 14. A depression 110 is formed in end 103 of base 104. Bicycle 114 is supported by base 104 in depression 110. Depression 110 has a width $W_1$ corresponding to the width of support member 115 of bicycle 114.

Preferably, the outside surface of rod 106 is threaded. A pair of nuts 112, 113 cooperate with rod 106. Nut 112 is positioned above work support surface 14 and nut 113 is positioned below work support surface 14. Nuts 112, 113 can be adjusted along the length of rod 106 for adjusting the height of rod 106 above work surface 14. The height above the work surface can be adjusted to allow the bicycle to be pedalled after being supported on the support base. A pair of support bases 102 are preferably used for supporting bicycle 114.

Adjusting means 108 holds support member 112 of bicycle 114 against depression 110. Adjusting means 108 includes a strap 118 and ring 120, as shown in FIG. 7B. End 117 of strap 118 is attached to the bottom surface 105 of base 104. End 119 of strap 118 wraps over the top surface 107 of base 104 and is received in ring 120. Preferably, upper surface portion 121 of end 117 of strap 118 is formed of a hook and loop material. End 117 doubles over itself and engages upper surface portion 121 of strap 118.

The present invention has the advantage of easily supporting objects on a work surface. In one embodiment, a ski or snowboard is supported in which the user has access to both the bottom surface and side surfaces. In addition, the object is supported so that there is sufficient clearance between the object and the work surface to enable the ski or snowboard to be supported without removing attached bindings. Alternatively, the ski or snowboard is held between the inner sides surfaces of a support base for providing additional support along the width of the board. In a second embodiment, a surfboard is attached to the work surface with straps. A base is attached to the straps and snaps into a hole in the work surface. The straps can be easily adjusted for expeditiously supporting the surfboard on the work surface. In a third embodiment, a bicycle is readily supported against a depression of a support base. The bicycle has the advantage of being capable of being pedaled while being attached to the work surface for maintenance of gear mechanisms.

While the invention has been described with reference to the preferred embodiment, this description is not intended to be limiting. It will be appreciated by those of ordinary skill in the art that modifications may be made without departing from the spirit and scope of the invention.

I claim:

1. An apparatus for supporting a bicycle on a work surface comprising:

at least one base having a first and second end for supporting said bicycle;

a depression formed in said first end of said base for receiving said bicycle;

a rod extending perpendicularly from said second end of said base, said rod being received in an aperture of said work surface, said rod having a threaded outer surface;

a nut having a threaded inner surface, said nut mating with said threaded outer surface of said rod for coupling said base to said work surface, a strap attached to the bottom surface of said base member, a ring attached to the upper surface of said base member, said strap is received in said ring; and adjusting means attached to said base for securing said bicycle in said depression, wherein a top portion of said strap is formed of a hook and loop material and said strap loops around said ring and is attached to itself.

* * * * *